J. JACKSON.
EQUALIZING DEVICE FOR SPEEDERS.
APPLICATION FILED DEC. 18, 1912.
1,111,466.
Patented Sept. 22, 1914.
2 SHEETS—SHEET 1.
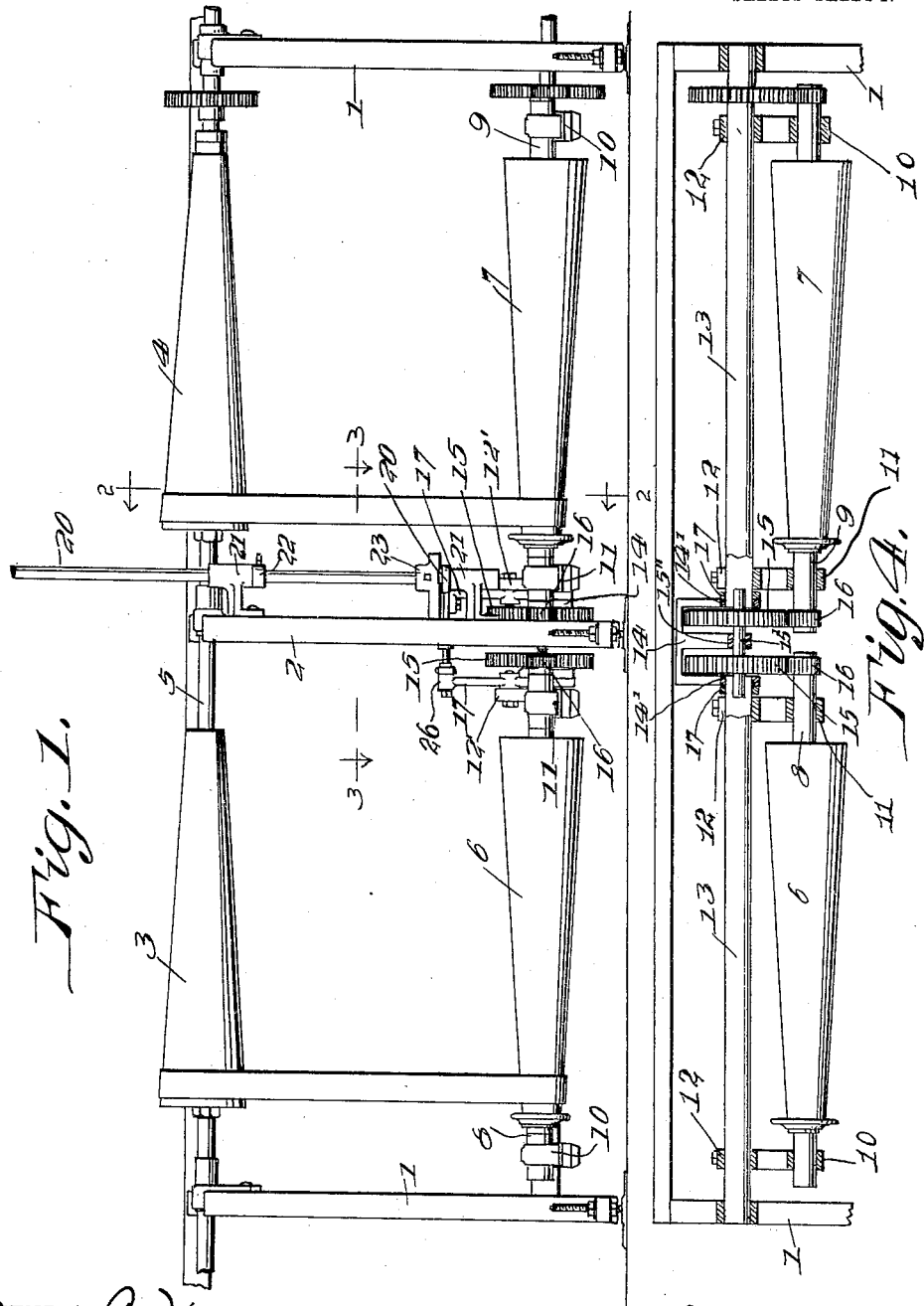
WITNESSES
Ada E. Hagerty
Annie F. Miller
INVENTOR
John Jackson
By Joseph A. Miller
Attorney

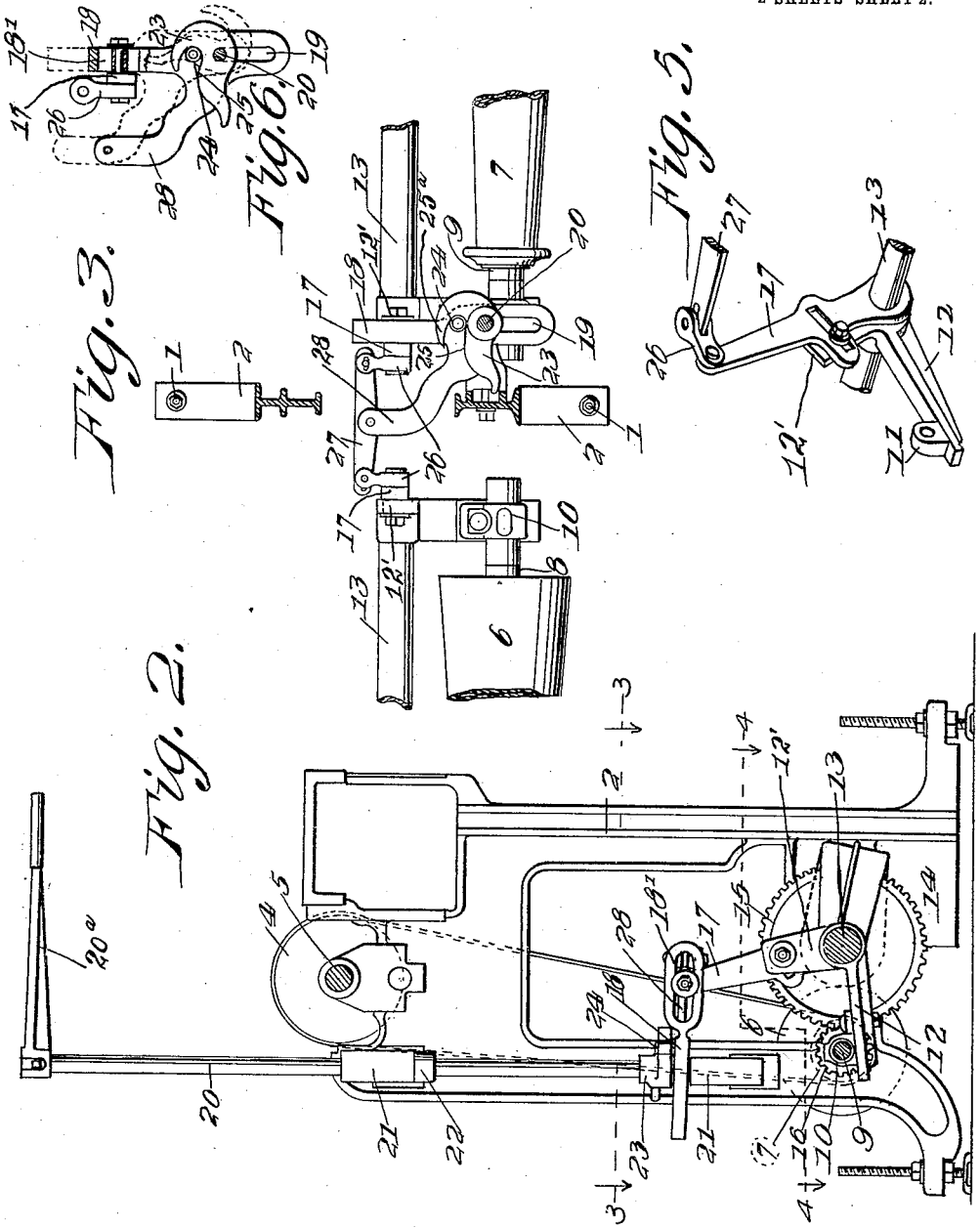

UNITED STATES PATENT OFFICE.

JOHN JACKSON, OF PAWTUCKET, RHODE ISLAND, ASSIGNOR TO H. & B. AMERICAN MACHINE COMPANY, OF PAWTUCKET, RHODE ISLAND, A CORPORATION OF MAINE.

EQUALIZING DEVICE FOR SPEEDERS.

1,111,466.

Specification of Letters Patent. Patented Sept. 22, 1914.

Application filed December 18, 1912. Serial No. 737,483.

*To all whom it may concern:*

Be it known that I, JOHN JACKSON, a citizen of the United States, residing at Pawtucket, in the county of Providence and State of Rhode Island, have invented a new and useful Improvement in Equalizing Devices for Speeders, of which the following is a specification.

This invention relates to certain new and useful improvements in equalizing devices for speeders, and the object of the invention is to provide a device of this type for use in connection with double sets of cones which have new and improved means for maintaining an equal drive between the driving and driven cones.

In the drawings—Figure 1 is a side elevation of the invention. Fig. 2 is a section on the line 2—2 of Fig. 1. Fig. 3 is a section on the line 3—3 of Fig. 1. Fig. 4 is a section on the line 4—4 of Fig. 2. Fig. 5 is a detail perspective view of one of the supports for the lower cones, and Fig. 6 is a detail top plan view of the means for effecting adjustment of the lower cone supports.

In accordance with the present invention, a frame including end members 1 and a central member 2 is employed. Upper cones 3 and 4 are mounted on a shaft 5 that is journaled in the members 2 of the frame. The lower cones 6 and 7 are mounted on independent shafts 8 and 9 respectively, the latter having their outer ends mounted in bearings 10 and having their inner ends mounted in bearings 11 which bearings 10 and 11 are carried on the free end of arms 12. The arms 12 are rigidly connected to the ends of a pair of shafts 13. A fitting 14 of W-shape is secured to the frame and provides bearings 14' for the confronting ends of the shafts 13. The confronting ends of the shafts 13 are bored out to receive a connecting stub-shaft 15' which latter is journaled in a central bearing 15'' formed on the fitting 14. Gears 15 are mounted on the stub-shaft 15' and mesh with pinions 16 which are mounted on the inner ends of the shafts 8 and 9 of the cones 6 and 7, respectively. An arm 17 is adjustably secured by means of a bolt and slot connection to the vertical projection 12' of each of the inner arms 12 12 and the upper end of one of said arms 17 is loosely secured by a bolt and slot connection to a horizontal member 18. The forward end of the horizontal member 18 is slotted at 19 to receive a vertical operating rod 20 which latter is mounted in bearings 21 secured to the frame member 2. A collar 22 is secured to the rod 20 and acts to engage bearing 21 prevent upward movement of the rod. A J-shaped member 23 is rigidly secured to the rod 20 and operates in connection with a pin 24 that is rigidly secured to and projects upwardly from the member 18, engaging with a cam face 25 that is formed on the member 23. Each arm 17 is provided with a coupling 26 which latter is connected to the ends of a connecting link 27, the latter being pivotally connected centrally of its length to a curved arm 28 that is formed on member 18.

In operation power is applied to the shaft 5 of the two top cones, the power being transmitted from the top cones to the bottom cones by reason of the belts. As the cones 6 and 7 are supported on the arms 12 and connected by the gears 15 in mesh with the pinions 16, should one of the belts be slightly increased in length the tendency of the cone connected to that belt will be to descend, thereby operating through the arms 12, 12' and 17 and the link 27 to relieve the pressure of the other cone on its belt, thus at all times maintaining a uniform drive between the driving and driven cones. The bottom cones in turn transmit power to the bobbin driving shaft, as is well known in speeder structures.

When sufficient yarn has been spun and it is desirable to doff the bobbins, the rod 20 is turned by means of the handle 20ª secured to the rod thereby causing the cam face 25 of the member 23 to move the pin 24 and member 18 inwardly. The inward movement of the member 18 from the full line position of Fig. 6 to that shown in dotted lines in said figure causes rearward movement of the arms 17 and therewith the arms 12' which are connected to the arms 17, thereby lifting the lower cones 6 and 7 upwardly, with the result that the weight of the cone is taken from the belt, permitting the rack mechanism to be easily run into the normal or starting point as the gearing is relieved of all weight. The bobbins are then doffed, new bobbins being placed in position, the rod 20 turned in the reverse direction, the weight of the cones 6 and 7 causing the member 18 to move outwardly as the rod assumes its normal position to lock the member 18 by reason of the pin 24 and the tail 25ª of the member 23.

Having thus described my invention, I claim as new and desire to secure by Letters Patent;—

1. In combination with the lower cones of a speeder, means to movably support each cone, equalizing means connecting the cones whereby downward movement of one cone will effect corresponding upward movement of the other cone, and means in positive connection with each cone for driving the cones in unison from their confronting ends.

2. In combination with the lower cones of a speeder and the driving belts thereof, means to support each cone so that each may be moved independent of the other, means to actuate the cones in unison, and means to raise the supporting means and thereby the cones out of engagement with the belts while the actuating means remains operative.

3. In combination with the lower cones of a speeder, a shaft for each cone, means in connection with the shafts for rotating the cones in unison, arms rigidly mounted on the shafts and supporting the lower cones, and means to actuate the shafts so as to raise or lower the cones.

4. In combination with the lower cones of a speeder, a shaft for each cone, arms rigidly mounted on the shafts and supporting the lower cones, a substantially vertical arm rigidly connected to each shaft, a link connecting said arms, and an actuating member connected to said link and to one of the arms.

5. In combination with the lower cones of a speeder, a shaft for each cone, arms rigidly mounted on the shafts and supporting the lower cones, a substantially vertical arm rigidly connected to each shaft, a link connecting said arms, a sliding member connected to the link and to one of the arms for actuating the shafts in unison, a pin on said member, and means for actuating the pin to thereby slide the member.

6. In combination with the lower cones of a speeder, a shaft for each cone, arms rigidly mounted on the shafts and supporting the lower cones, a substantially vertical arm rigidly connected to each shaft, a link connecting said arms, a sliding member connected to the link for actuating the shafts in unison, a pin on said member, a rotatable member having a cam face to engage the pin to thereby actuate the sliding member, and means to rotate said rotatable member.

7. In combination with the lower cones of a speeder and the driving belts thereof, means to movably support said cones, means connected to the cones to positively actuate the cones in unison, and means to raise the cones in unison out of engagement with the belts thereof, while the actuating means remains operative.

8. In combination with the lower cones of a speeder, having their inner ends arranged in spaced relation, means to movably support each end of each cone, and means arranged in the space between the cones to drive said cones in unison and means to automatically regulate the tension on the belts without disengaging the driving means.

9. In combination with the lower cones of a speeder, and means to movably support said cones, means connecting and actuating said cones, a vertically disposed rotatable member, and means actuated by said member to raise or lower the cones in unison while the actuating means remains operative.

10. In combination with the lower cones of a speeder, arms for supporting each cone, a vertical arm adjustably connected to one of the first named arms of each cone, a horizontally slidable member connected to one of the second named arms, means to slide said member, and means to connect the second named arms to each other and to the sliding member.

11. In combination with a speeder having a pair of cones, means to movably and independently mount each cone, means in positive connection with each cone for driving the cones in unison, and means for connecting the cones to equalize the action thereof.

12. In combination with a pair of speeder cones and the belts thereof, means to mount each cone so that same has arc-like movement, means to equalize the action of the cones, and means independent of the belts to drive the cones regardless of the action of the equalizing means.

In testimony whereof I have signed my name to this specification in the presence of two subscribing witnesses.

JOHN JACKSON.

Witnesses:
ADA E. HAGERTY,
J. A. MILLER.